March 8, 1932. R. KOLLMAR 1,848,892
SHOCK ABSORBING DEVICE
Filed Sept. 16, 1930

INVENTOR
Robert Kollmar
BY
Fred C. Fischer
ATTORNEY

Patented Mar. 8, 1932

1,848,892

UNITED STATES PATENT OFFICE

ROBERT KOLLMAR, OF IRVINGTON, NEW JERSEY

SHOCK ABSORBING DEVICE

Application filed September 16, 1930. Serial No. 482,217.

This invention relates to shock absorbing devices and more particularly to such devices for use on transmission gear shift levers.

In the usual automobile, the shifting of change speed gears is generally accompanied by considerable vibration and shock to the gear shift lever. Obviously, such vibrations and shocks are imparted to the hand of the operator and are exceedingly annoying and uncomfortable, the effects being especially noticeable by female operators.

Inasmuch as it is very desirable to eliminate in an automobile, as far as possible, all shocks, vibrations and noises, it is an object of this invention to provide a device for a gear shift lever which will absorb the vibrations and shocks incident to the shifting of change speed gears.

A further object is the provision of a shock absorbing device which may be conveniently and readily attached to a gear shift lever without in any way necessitating the altering of the structure of the lever.

These and other advantageous objects are attained by the novel construction, combination and arrangement of parts hereinafter described and shown in the accompanying drawings, constituting a material part of this disclosure and in which.

Figure 1:
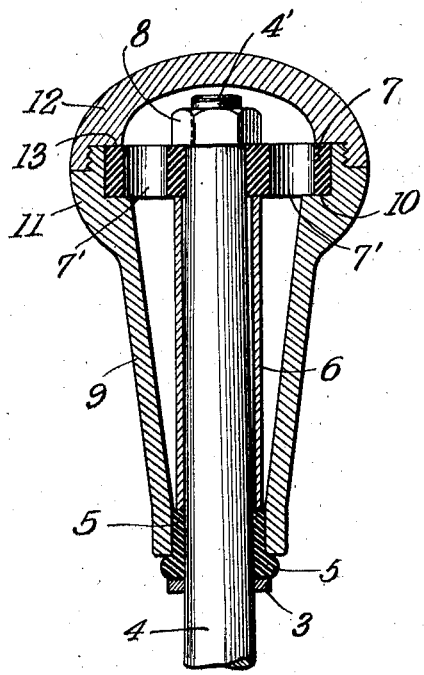
Figure 1 represents a sectional view of the device.
Figure 2:
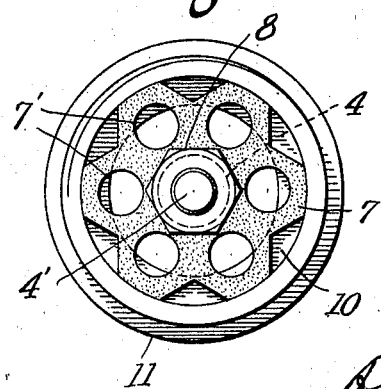
Figure 2 represents a plan view of the device with the cover removed.

Referring to the drawings, the shock absorbing device is shown applied to a standard gear shift lever 4, preferably tapered. The device is shown to include a short rubber collar 5 having a flange 5', the collar 5 being supported by a washer 3 on the lever 4.

A metal tube 6 rests upon the upper edge of the collar 5 and spaces the latter from a resilient member 7; which in the present case is shown to be in the form of a disc made from rubber and to have a plurality of holes 7' therein. A nut 8, threadedly engaging the reduced portion 4' of the gear shift lever securely holds the disc 7 in position.

The member 7 fits snugly against the inner wall of a frusto-conical casing 9, preferably made of bakelite or a similar material, and the lower end of casing 9 rests on the flange 5' of collar 5.

Integral with the casing 9 is the lower portion 11 of the hand grip of the device, the upper portion or cover 12 being in threaded engagement with the lower portion 11.

The member 7 lies between an annular shoulder 10 on the lower grip portion 11 and the shoulder 13 on the upper grip portion 12 and when portions 11 and 12 are in threaded engagement, the periphery of the member 7 is securely held in position.

In operation, when the lever 4 is moved, for example, forwardly, the resilient member 7 will be compressed in the rear of the lever, and any vibrations or shocks incident to the shifting of gears will be absorbed by the member 7 and the collar 5. Similarly, there will be a compression of the member 7 regardless of the direction in which the lever 4 may be moved.

The foregoing disclosure is to be regarded as descriptive and illustrative only, and not as restrictive or limitative of the invention, of which, obviously, an embodiment may be constructed including modifications without departing from the general scope herein indicated and denoted in the appended claims.

Having thus described my invention, what I claim as new and desire to secure by Letters Patent, is:

1. In combination with a transmission gear shift lever, a hand grip, comprising a flanged collar fitting about the lever, a spacing tube resting on the collar, a resilient member resting on the tube, means for clamping the member securely against the tube, a frusto-conical casing resting on the flange of the collar, and a hand grip connected to the casing.

2. In combination with a transmission gear shift member, a shock absorbing device, comprising a tubular casing, a disc of resilient material supported on the lever for spacing the upper end of the casing from the lever, a hand grip attached to the casing, and means on said hand grip for holding said disc in position.

This specification signed this 22 day of May, 1931.

ROBT. KOLLMAR.